(12) United States Patent
Frank et al.

(10) Patent No.: US 6,358,022 B1
(45) Date of Patent: Mar. 19, 2002

(54) FEEDING DEVICE FOR FUEL

(75) Inventors: Kurt Frank, Schordorf; Albert Gerhard, Tamm, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/391,802

(22) Filed: Sep. 9, 1999

(30) Foreign Application Priority Data

Sep. 19, 1998 (DE) .......................................... 198 43 021

(51) Int. Cl.[7] ................................................. F04B 35/04
(52) U.S. Cl. ................................................... 417/423.9
(58) Field of Search .......................... 417/423.9, 423.1, 417/410.1, 321; 137/549, 115, 510; 123/467, 514

(56) References Cited

U.S. PATENT DOCUMENTS

| | | | | |
|---|---|---|---|---|
| 3,969,044 A | * | 7/1976 | Fussner et al. | |
| 4,153,394 A | * | 5/1979 | Nakada | 417/571 |
| 4,161,647 A | * | 7/1979 | Carbonnel | 392/473 |
| 4,551,071 A | * | 11/1985 | Ohgaki et al. | 417/313 |
| 4,692,092 A | * | 9/1987 | Matsuda et al. | 415/143 |
| 4,707,982 A | * | 11/1987 | Wagner | 60/258 |
| 4,775,295 A | * | 10/1988 | Starke et al. | 415/182.1 |
| 5,007,450 A | * | 4/1991 | Babb et al. | 137/315 |
| 5,282,727 A | * | 2/1994 | Willinger | |
| 5,290,157 A | * | 3/1994 | Willinger et al. | 417/423.15 |
| 5,357,667 A | * | 10/1994 | Schutz | 29/509 |
| 5,567,127 A | * | 10/1996 | Wentz | 417/312 |
| 5,647,330 A | | 7/1997 | Sawert et al. | |
| 5,980,221 A | * | 11/1999 | Uffelman | 417/540 |
| 6,042,341 A | * | 3/2000 | Richter | |

FOREIGN PATENT DOCUMENTS

| | | |
|---|---|---|
| EP | 0 754 852 A2 | 1/1997 |
| EP | 0 964 747 A1 | 12/1999 |
| WO | 99/30027 | 6/1999 |

\* cited by examiner

*Primary Examiner*—Sang Paik
*Assistant Examiner*—Daniel Robinson
(74) *Attorney, Agent, or Firm*—Michael J. Striker

(57) ABSTRACT

A feeding device for feeding fuel, comprising a feed pump, an electric motor driving the feed pump, filtering means, a housing composed of synthetic plastic and formed as a filter casing for receiving the electric motor, the feed pump and the filtering means, the filter casing having concentric housing walls, and a metal jacket arranged at the concentric housing walls at least at one side.

19 Claims, 4 Drawing Sheets

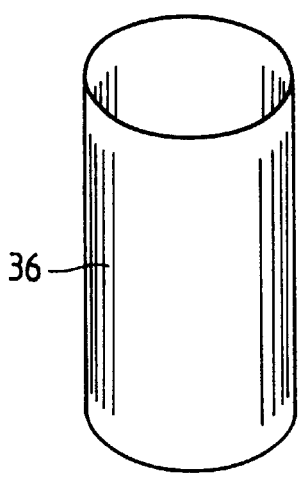
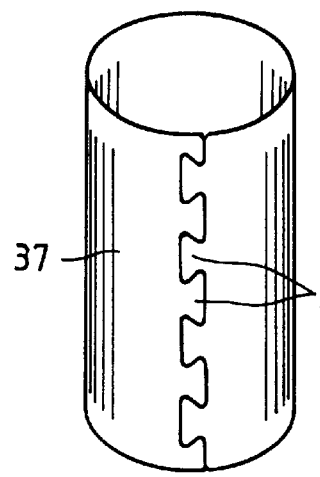
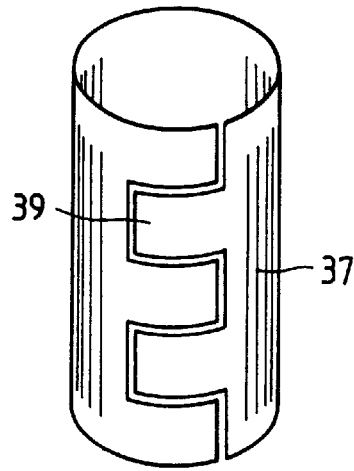
Fig.6     Fig.7     Fig.8
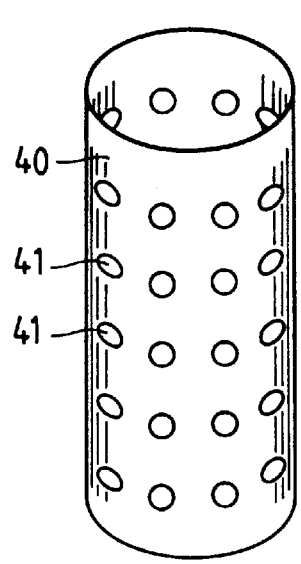
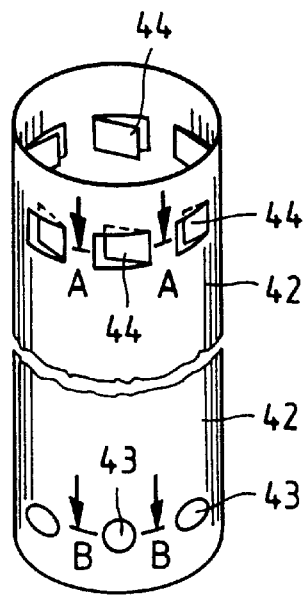
Fig.9     Fig.10
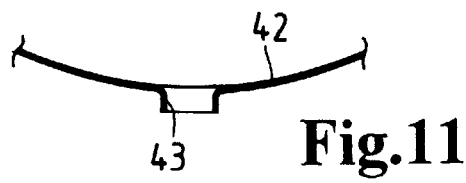
Fig.11

FEEDING DEVICE FOR FUEL

BACKGROUND OF THE INVENTION

The present invention relates to a feeding device for feeding fuel.

Feeding devices of the above mentioned general type are known in the art. In a known feeding device the fuel is supplied from a fuel tank, for example to an injection system of the internal combustion engine of a motor vehicle. Such a feeding device provided with a housing of synthetic plastic is disclosed for example in the German patent document DE 44 44 854 A1. In this feeding device, the feed pump is driven by an electric motor, and the fuel flows from the feed pump through a pre-filter, and after the feed pump is supplied under the feeding pressure to a main filter. These components are arranged in a filter casing with a removable cover. The electric motor and the feed pump are located in a central chamber, and the main filter is located in a ring chamber which is arranged concentrically around the main chamber.

The cover of the filter casing of this device has communications to tubular connections or pressure hoses through which the fuel is supplied to a connecting flange on the fuel tank. The feeding device forms a complete feeding module which can be directly mounted in the fuel tank. The fuel is aspirated from below on the feeding module and can be supplied from the connecting flange on the cover of the fuel tank through a supply conduit to an internal combustion engine.

Such a feeding module needs a plurality of connecting flanges and suspensions, for example for a fixed suspension of the central fuel pump. They are geometrically complicated and therefore produced of synthetic plastic, for example a synthetic plastic injection molded parts, for costs reasons. In this known device it is important to maintain a space for components which is as small as possible and to prevent electrical discharge which can lead to an ignition of the fuel or fuel-air mixture in the tank. The corresponding withdrawl of electrostatic charges can be performed with difficulties because the components are composed of synthetic plastic and they are either non conductive or have poor electrical conductivity.

SUMMARY OF THE INVENTION

Accordingly, its an object of present invention to provide a feeding device of the above mentioned general types which avoids the disadadvantages of the prior art.

In keeping with these objects and with others which will become apparent hereinafter, one feature of present invention resides, briefly stated, in a feeding device of the above mentioned type, in which a metal jacket is arranged in or on the concentric housing walls of the filter casing for receiving the filtering means at both sides of the filtering means or at one side.

When the feeding device is designed in accordance with the present invention, then in advantageous manner, a geometrical relatively complicated housing can be produced by free shaping of synthetic plastic, and with simple means an improvement of the strength properties is obtained with a small wall thickness, since the outer diameter of the filter casing can be maintained small due to relatively thin and eventually cast metal jacket. The synthetic plastic housing does not have any swelling problems under the action of the through flowing fuel which can lead to changes of its geometry.

Moreover, in the inventive device static discharges are withdrawn, since a metal jacket is arranged on the filtering means at the inner and/or outer side. This can be provided in a simple manner with an electrical connecting means.

Also, in advantageous manner uniform electrical potential can be produced through the metal jacket, for example through an electrically conductive tank cover, an electrically conductive feed pump, or a similar part of a motor vehicle located in a feeding path of the fuel.

In accordance with a preferable embodiment of the invention, the metal jacket can be formed as a tubular sleeve or a metal plate which is bent to form a tube. It can be interlocked or overlapped at the axial seam location.

Furthermore, the metal jacket can be provided with drilled openings or punched holes on its periphery, to ensure an efficient mechanical connection to the synthetic plastic parts of the filter casing. This advantage is also obtained when the metal jacket is provided at the side facing the filter unit with imprints, indentations and similar roughnesses.

The metal jacket, before the final mounting can extend substantially over the synthetic plastic part of the filtering unit, and then mounted by crimping, flanging, mortising on the housing part and on the cover for the filtering unit. Thereby a mechanical connection between these components can be established.

The metal jacket can be also produced on a terminal post of the electric motor for driving the fuel pump. Thereby a simple terminal guide for the electric motor is formed.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 6–10 are views showing embodiments of the metal jacket; and

FIG. 11 is a view showing two sections through the metal jacket of FIG. 10.

DESCRIPTION OF PREFERRED EMBODIMENTS

Figure 1:
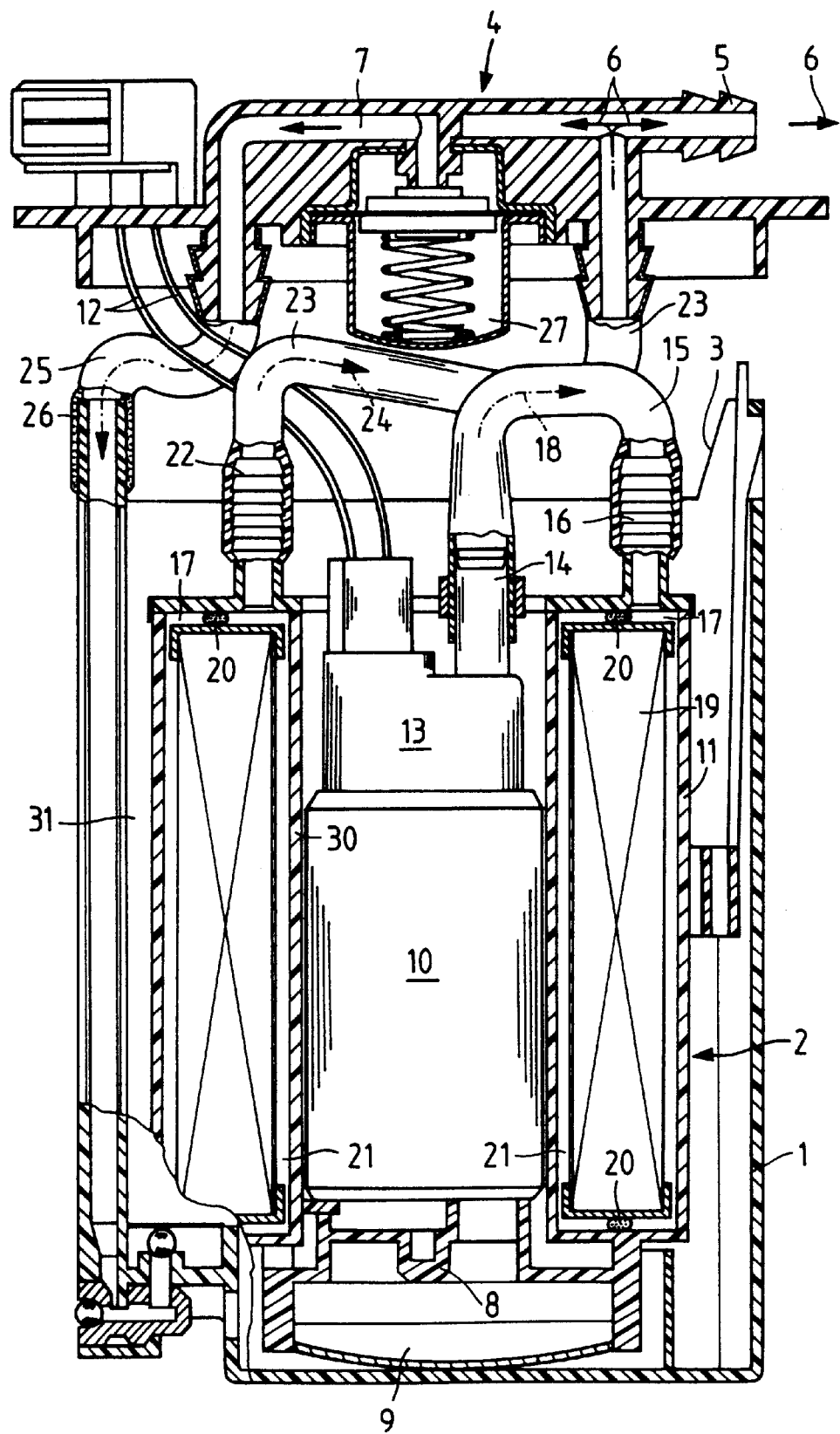
FIG. 1 is a view showing a section of a feeding device for fuel with an inwardly located filtering unit.

FIG. 1 shows a longitudinal section of a fuel tank 1 with a feeding module or a feeding device 2, which can be inserted from above through an opening 3 of the fuel tank 1. The opening 3 is closeable with the tank flange 4. A connection pipe 5 is provided on the tank flange 4 for a not shown supply conduit which leads to an internal combustion engine of a motorvehicle and transports the fuel in direction of the arrow 6. Furthermore, the tank flange 4 is provided with the connection for a fuel return conduit 7 coming from the internal combustion engine and for a pressure regulator 27 whose operation is not important for the understanding of the present invention.

The feeding device 10 is provided with a feed pump in a lower region. It aspirates fuel from a bottom region of the fuel tank 1 through a pre-filter 9. The feed pump is driven by an electric motor 10 which is located above the feed pump 8 in a filter casing 11 as a housing. The electric motor 10 is supplied through connecting conductors 12 with an electrical voltage and controlled by it. The cover 13 of the electric motor 10 is composed of an electrically conductive material.

A tubular connection 15 is connected to a connecting flange 14 of the electric motor 10. The supplied fuel flows through it through a connecting pipe 16 into an outer chamber 17 of the filter casing 11. A main filtering element 19 is located in the filter casing 11 concentrically around the central chamber with the electric motor 10. The main filter element 19 is subdivided by ring seals 20 of the filter casing 11 into the outer chamber 17 and the inner chamber 21. The fuel filtered through the main filter element 19 passes from the inner chamber 21 to a connecting pipe 22.

Figure 2:
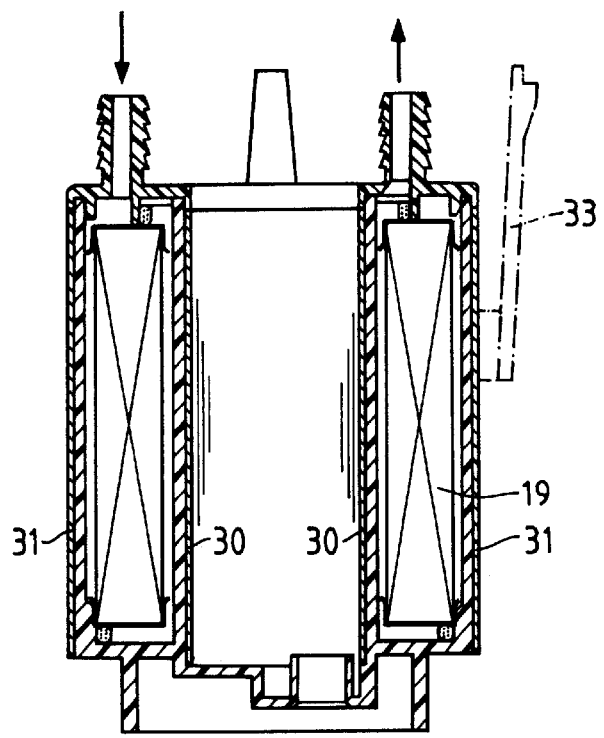
FIG. 2 is a view showing a section through a filter casing of the feeding module with an inventive arrangement of an additional outer and inner jacket of metal.

A tubular connection 23 is connected to the connecting pipe 22 and produces a communication to the tank flange 4. Therefore, the fuel can flow in direction of the arrows 24 and 6 from the inner chamber 21 in the filter casing 11 to the outer supply conduit. Also, the fuel return conduit 7 is connected through a tubular connection 25 to a connecting pipe 26 of the fuel tank 1. The main filter element 19 of the filter unit is located between an inner synthetic plastic wall and a concentrical outer synthetic plastic wall. In FIG. 2 an embodiment is shown with a metal jacket 30 on the inner wall and a metal jacket 31 on the outer wall. Also, a suspension 33 is illustrated in FIG. 2. It is used for anchoring the outer metal tube 31 and the total filter casing 11.

Figure 3:
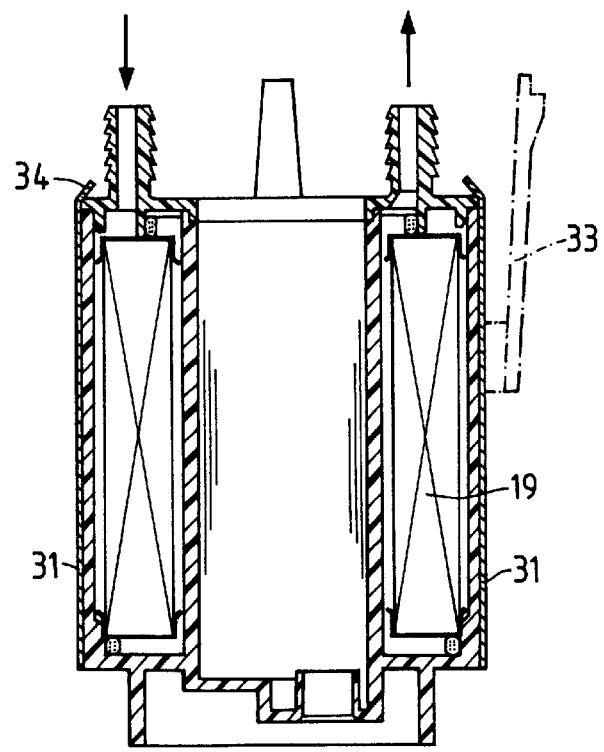
FIG. 3 is a view showing an embodiment with an outer metal jacket, which overlaps the housing part of the filter unit.

In the embodiment of FIG. 3 an outer tube 31 is provided. It projects, before the end mounting, upwardly of a predetermined region 34. During mounting it is crimped, mortised or flanged and thereby provides a simple and fixed mounting of the filter casing 11.

Figure 4:
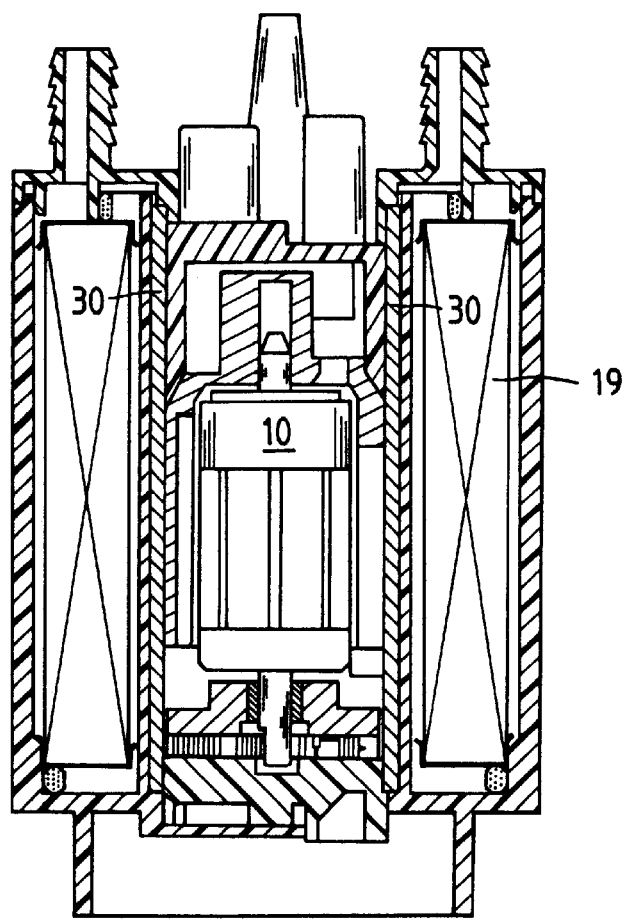
FIG. 4 is a view showing an embodiment with an inner metal jacket which is formed as a pole tube for an electric motor.
Figure 5:
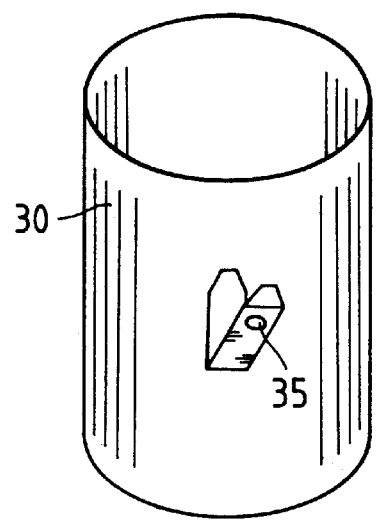
FIG. 5 is a view showing an embodiment of the metal jacket with a terminal for an electrical connection, in particular for the embodiment of FIG. 4.

FIG. 4 shows an embodiment with an inner metal tube 30, which can be used as a pole tube for the electric motor 10. The metal tube 31 can be cast, for example in a synthetic plastic injection molding of the housing part for the filter casing 11. A terminal connection for the electric motor 10 can be performed through an electrical contact to a terminal 31 as can be seen from FIG. 5.

Further examples for the embodiment of an inner metal tube 30 and/or an outer metal tube 31 are shown in FIGS. 6–10. FIG. 6 shows a simple metal tube sleeve 36, FIG. 7 shows a flanged sheet metal part 37 with interlocked regions 38 at the seam point, and FIG. 8 shows a sheet metal part 37 with overlapping 39 at the seam point. FIG. 9 shows a tubular sleeve 40 which, for improved mechanical contact with the synthetic plastic of the corresponding wall of the housing of the filter casing 11, is provided with drilled openings or punched out formations 41. In FIG. 10, for the same purpose, imprints 43 or indentations 44 are formed in the tubular sleeve 42 for the same purposes. The imprints 43 are illustrated in a section B—B and the indentations 44 are illustrated in section A—A in FIG. 11.

It will be understood that each of the elements described above, or two or more together, may also find a useful application in other types of constructions differing from the types described above.

While the invention has been illustrated and described as embodied in feeding device for fuel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A feeding device for feeding fuel, comprising a feed pump; an electric motor driving said feed pump; filtering means; a housing composed of synthetic plastic and formed as a filter casing for receiving said electric motor, said feed pump and said filtering means, said filtering casing having concentric housing walls; and a metal jacket arranged at said concentric housing walls at least at one side, for improving strength properties and withdrawing static discharges.

2. A feeding device as defined in claim 1; and further comprising another metal jacket arranged at the other side of said concentric housing walls.

3. A feeding device as defined in claim 1, wherein said at least one casing is arranged in said concentric housing walls.

4. A feeding device as defined in claim 1, wherein said metal jacket is arranged on said concentric housing walls.

5. A feeding device as defined in claim 1; and further comprising means for withdrawing static charges and including a ground connection from said at least one metal jacket to a metal part of a motor vehicle.

6. A feeding device as defined in claim 1, wherein said metal jacket is formed as a tubular sleeve.

7. A feeding device as defined in claim 1, wherein said metal jacket is formed as a sheet metal part which is bent to form a tube.

8. A feeding device as defined in claim 7, wherein said sheet metal part interlocks at an axial seam point.

9. A feeding device as defined in claim 7, wherein said sheet metal part overlaps at an axial seam point.

10. A feeding device as defined in claim 1, wherein said metal jacket is provided with drilled openings.

11. A feeding device as defined in claim 1, wherein said metal jackets is provided with punched-out formations.

12. A feeding device as defined in claim 1, wherein said metal jacket at a side facing said filtering means is provided with roughness.

13. A feeding device as defined in claim 11, wherein said roughness are formed as imprints.

14. A feeding device as defined in claim 11, wherein said roughness are formed as indentations.

15. A feeding device as defined in claim 1, wherein said metal jacket is mounted on a periphery and on a cover of said filter casing to provide a mechanical connection between said metal jacket and said filter casing.

16. A feeding device as defined in claim 15, wherein said metal casing is connected with said filter casing by crimping.

17. A feeding device as defined in claim 15, wherein said metal casing is connected with said filter casing by flanging.

18. A feeding device as defined in claim 15, wherein said metal casing is connected with said filter casing by mortising.

19. A feeding device as defined in claim 1, wherein said metal casing forms a terminal post of said electric motor for driving said feed pump.

* * * * *